United States Patent
Van Wageningen et al.

(10) Patent No.: US 10,879,744 B2
(45) Date of Patent: Dec. 29, 2020

(54) FOREIGN OBJECT DETECTION IN A WIRELESS POWER TRANSFER SYSTEM

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 21 days.

(21) Appl. No.: 16/465,706

(22) PCT Filed: Nov. 24, 2017

(86) PCT No.: PCT/EP2017/080284
§ 371 (c)(1),
(2) Date: May 31, 2019

(87) PCT Pub. No.: WO2018/104068
PCT Pub. Date: Jun. 14, 2018

(65) Prior Publication Data
US 2019/0334388 A1     Oct. 31, 2019

(30) Foreign Application Priority Data
Dec. 5, 2016   (EP) .................................. EP16202209

(51) Int. Cl.
*H02J 50/60*   (2016.01)
*H02J 50/12*   (2016.01)
(Continued)

(52) U.S. Cl.
CPC .............. *H02J 50/60* (2016.02); *H02J 5/005* (2013.01); *H02J 7/025* (2013.01); *H02J 50/12* (2016.02)

(58) Field of Classification Search
CPC ...................................................... H02J 50/60
See application file for complete search history.

(56) References Cited

U.S. PATENT DOCUMENTS 9,479,013 B2 * 10/2016 Joye .................... H02J 50/80
10,320,241 B2 * 6/2019 Chen ..................... H02J 7/025
(Continued)

FOREIGN PATENT DOCUMENTS

| EP | 2779359 A | 9/2014 |
|----|-----------|--------|
| WO | 2005007696 A2 | 1/2005 |

(Continued)

OTHER PUBLICATIONS

Wireless Power Consortium, https://www.wirelesspowerconsortium.com/, Accessed May 2019.

(Continued)

*Primary Examiner* — Hai L Nguyen

(57) ABSTRACT

A wireless power transfer system includes a power receiver (105) comprising a coil (107) for extracting power from an electromagnetic signal generated by a power transmitter (101). A load controller (305, 309) disconnects a load (303) during a foreign object detection interval and a power controller (307, 311) transmits power control messages reflecting a difference between an induced signal level and a reference level. A message transmitter (307, 313) transmits a predetermined loading indication for the reference level to the power transmitter (101) indicating a predetermined amount of power being extracted from the electromagnetic signal by the power receiver (105) when the load is disconnected and the induced signal is at the reference level. The power transmitter adapts the power level of the electromagnetic signal in response to the power control messages and a foreign object detector (207) performs a foreign object detection in response to a comparison of the power level of (Continued)

the electromagnetic signal and the predetermined loading indication.

15 Claims, 4 Drawing Sheets

(51) Int. Cl.
*H02J 5/00* (2016.01)
*H02J 7/02* (2016.01)

(56) References Cited

U.S. PATENT DOCUMENTS

| | | |
|---|---|---|
| 10,476,313 B2 * | 11/2019 | Nguyen .................. H02J 50/60 |
| 2010/0013320 A1 | 1/2010 | Shiozaki et al. |
| 2014/0184150 A1 | 7/2014 | Walley |
| 2015/0263532 A1 | 9/2015 | Van Wageningen |
| 2016/0149440 A1 | 5/2016 | Staring et al. |

FOREIGN PATENT DOCUMENTS

| | | |
|---|---|---|
| WO | 2012127335 A1 | 9/2012 |
| WO | 2014060871 A1 | 4/2014 |
| WO | 2015018868 A1 | 2/2015 |
| WO | 2015144389 A1 | 10/2015 |

OTHER PUBLICATIONS

International Search Report and Written Opinion, International Application No. PCT/EP2017/080284, dated Jan. 26, 2018.

* cited by examiner

FOREIGN OBJECT DETECTION IN A WIRELESS POWER TRANSFER SYSTEM

CROSS-REFERENCE TO PRIOR APPLICATIONS

This application is the U.S. National Phase application under 35 U.S.C. § 371 of International Application No. PCT/EP2017/080284, filed on 24 Nov. 2017, which claims the benefit of European Patent Application No. 16202209.9, filed on 5 Dec. 2016. These applications are hereby incorporated by reference herein.

FIELD OF THE INVENTION

The invention relates to foreign object detection in an wireless power transfer system and in particular, but not exclusively, to foreign object detection for a power transmitter providing inductive power transfer to higher power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is by determining unknown power losses, as e.g. disclosed in WO 2012127335. Both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that contains the power receiver or of the power transmitter arrangement itself) as the magnetic and electrical properties of these may be unknown and therefore may be difficult to compensate for. Moreover, the spatial alignment between the power receiver and the power transmitter is typically not known and this may substantially affect the measured values. Also, the lateral extension of the generated magnetic field is typically not known, and may vary substantially between different power transmitters.

Further, undesirable heating may result from even relatively small amounts of power being dissipated in a metallic foreign object. Therefore, it is necessary to detect even a small power discrepancy between the transmitted and received power and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

Accordingly, current algorithms tend to be suboptimal and may in some scenarios and examples provide less than optimum performance. In particular, they may result in foreign objects that are present not being detected, or in false detections of foreign objects when none are present.

Hence, an improved object detection would be advantageous and in particular an approach allowing increased flexibility, reduced cost, reduced complexity, improved object detection, fewer false detections and missed detections, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an wireless power transfer system comprising a power transmitter and a power receiver for receiving a power transfer from the power transmitter via an electromagnetic signal; the power receiver comprising: a power receiver coil for extracting power from the electromagnetic signal; a load controller arranged to disconnect a load of the power receiver coil during a foreign object detection interval; a power controller for transmitting power control messages to the power transmitter during the foreign object detection interval, the power control messages reflecting a difference between a level of an induced signal in the power receiver coil and a reference level; a message transmitter for transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level; and the power transmitter comprising: a power transmitter coil for generating the electromagnetic signal; a message receiver for receiving the power control messages and the predetermined loading indication from the power receiver; a power loop controller for controlling a power level of the electromagnetic signal in response to the power control messages; a foreign object detector for, during the foreign object detection interval, performing a foreign object detection in response to a comparison of the power level of the electromagnetic signal and the predetermined loading indication.

The invention may provide improved foreign object detection in many embodiments. In many scenarios and systems, a more accurate foreign object detection may be achieved. The approach may in many embodiments reduce complexity and may in many systems provide a high degree of backwards compatibility. Specifically, the approach may be particularly suitable for improving foreign object detection in Qi wireless power transfer systems e.g. operating in accordance with version 1.2 or earlier of the Qi Specifications.

The approach may e.g. introduce a foreign object detection test mode in which the power receiver can operate with both a high induced voltage yet light load, corresponding to a high magnetic field strength yet low loading of the electromagnetic signal. In such scenarios, the impact of a foreign object may be more noticeable as power induced in such an object will represent a higher proportion of the total power extracted. Indeed, the higher magnetic strength may result in a higher induced signal in the foreign object, and the reduced loading may reduce the impact of the presence of the power receiver when detecting whether a foreign object is present.

The electromagnetic signal may during the foreign object detection interval specifically be an electromagnetic detection signal, and may be generated for the specific purpose of detection whether any foreign objects are present. During the foreign object detection interval, the electromagnetic signal may both provide a signal for detecting foreign objects and provide a power transfer to the power receiver. Due to the disconnection of the load of the receiver coil, the power transfer will typically be substantially lower than the power during a subsequent power transfer phase.

The load may be a switchable load which is disconnected during the foreign object detection interval but not during a subsequent power transfer phase. The receiver coil may during the foreign object detection interval be loaded by a residual load. The residual load may be fully or partially present during a subsequent power transfer phase. The load being disconnected may be a switchable load representing the load of the receiver coil which is present during a subsequent power transfer phase but not during the foreign object detection interval.

The power controller and power loop controller may together form a power control loop which during the foreign object detection interval drives the power of the electromagnetic signal such that the induced signal is at the reference level. The power loop controller may be arranged to increase the power level of the electromagnetic signal in response to power control messages indicating that the level of the induced signal in the power receiver coil is lower than the reference level and to decrease the power level of the electromagnetic signal in response to power control messages indicating that the level of the induced signal in the power receiver coil is higher than the reference level.

The foreign object detector may be arranged to determine that a foreign object is detected if a difference between the power level of the electromagnetic signal and the power indicated by the predetermined loading indication to be extracted from the electromagnetic signal is above a threshold. If the difference is below the threshold, the foreign object detector may determine that no foreign object is detected.

The foreign object detection interval may occur as part of a power transfer initialization. Specifically, it may be performed as part of a power transfer initialization which leads to a subsequent power transfer phase. The system may only proceed to the power transfer phase if no foreign object is detected.

The predetermined loading indication may only be dependent on the reference level, and may specifically be determined as a predetermined function of the reference level. In many embodiments, the predetermined loading indication may be stored and retrieved from memory. The predetermined loading indication may in many scenarios be determined based only on information available prior to the start of the foreign object detection interval. In many embodiments, the reference level may be a predetermined reference level known prior to the foreign object detection interval, and the predetermined loading indication may be fully known prior to the beginning of the foreign object detection interval. The predetermined loading indication may in many embodiments be determined without any measurements of any currents during the foreign object detection interval, and in many embodiments without any measurements whatsoever.

The predetermined loading indication may be transmitted to the power transmitter as during the foreign object detection interval or may e.g. be transmitted prior to this, such as e.g. when the power receiver is first detected.

The induced signal being at the reference level may correspond to the level of the induced signal being equal to the reference level.

The predetermined loading indication indicates the loading of the electromagnetic detection signal expected when the power receiver is operating at a specific operating point (load disconnected, induced signal level at reference level). The power receiver may then use power control messages to drive the power receiver towards operating at this condition, and accordingly a foreign object detection can be performed based on the predetermined loading indication. The power control messages may be used to reduce a difference between the induced signal level and the reference level to acceptable levels such that the predetermined loading indication provides a sufficiently accurate indication of the loading. The predetermined loading indication may be transmitted at any suitable time, including prior to the foreign object detection interval. The foreign object detection may be performed at different times in different embodiments, and may often be delayed to allow the power control loop to reach a relatively stable state with the induced signal level sufficiently close to the reference level.

In accordance with an optional feature of the invention, the level of the induced signal is represented by a voltage level indicative of a voltage over the power receiver coil.

This may be particularly efficient and provide high performance yet facilitate implementation. The voltage over the power receiver coil may for example be a peak, RMS, or average absolute voltage.

The voltage level may be a voltage measured after rectification, and typically low pass filtering, of the induced signal.

In many embodiments, the level of the induced signal is a voltage level indicative of a voltage over the power receiver coil, or indeed is a measured voltage over the power receiver coil.

In accordance with an optional feature of the invention, the power controller is arranged to generate the power control messages to reflect a difference between a reference voltage and a voltage measured after rectification and low pass filtering of the induced signal.

This may be particularly efficient and provide high performance yet facilitate implementation. The low pass filtering may specifically be in the form of a smoothing or ripple capacitor coupled to the output of a rectifier. The rectifier performing the rectification may in many embodiments be a full bridge rectifier.

In accordance with an optional feature of the invention, the reference level is a voltage level not below 3V and not above 30V.

This may provide attractive performance in many embodiments. In particular, it may allow a desirable trade-off between a large, but not too large, electromagnetic field strength during the foreign object detection interval and the desire to not have problematic high voltages induced at the power receiver. The approach may allow high electromagnetic field strength yet low loading by the power receiver. This may provide improved accuracy of the foreign object detection. The voltage may for example be a peak, RMS, or average absolute voltage over the power receiver coil.

In accordance with an optional feature of the invention, the reference level is a predetermined reference level.

A predetermined reference level may improve foreign object detection in many scenarios and may in particular result in a more predictable and advantageous test configuration. It may allow a more accurate predetermined loading indication in many embodiments, and may e.g. allow the predetermined loading indication to be stored as a fixed value which can simply be retrieved and transmitted to the power transmitter.

In accordance with an optional feature of the invention, a loading of the power receiver coil when the load is disconnected is not above 1 W.

This may provide improved foreign object detection in many embodiments and scenarios.

In accordance with an optional feature of the invention, a resistive component of a loading of the power receiver coil when the load is disconnected is not less than 100 Ohm.

This may provide improved foreign object detection in many embodiments and scenarios.

In accordance with an optional feature of the invention, the power receiver is arranged to determine the predetermined loading indication as a predetermined function of the reference level.

This may provide efficient, accurate, and/or low complexity foreign object detection. The predetermined function may be a function of only the reference level. The predetermined function may e.g. be determined during a manufacturing or design phase for the power receiver, and may be stored in memory, e.g. as a look-up-table.

In accordance with an optional feature of the invention, the foreign object detection is part of a calibration phase prior to initiation of a power transfer phase.

The approach may be particularly suitable to a calibration phase. The calibration phase may be one wherein the power transmitter calibrates e.g. a foreign object detection to be used during a power transfer phase to the specific power receiver, and specifically to the power extraction characteristics of the power receiver. Such a calibration phase may in many scenarios include a light load calibration, and the foreign object detection may be performed during a time interval in which such a light load condition is enabled. The power transmitter may only proceed with the calibration of the foreign object detection based on the predetermined loading indication indicates that no foreign object is present.

The approach may be particularly suitable for a calibration of a Qi wireless transfer system, such as specifically a calibration of a Qi wireless transfer system operating in accordance with the Qi Specifications version 1.2 or lower (and typically also with higher versions).

In accordance with an optional feature of the invention, the predetermined loading indication reflects a measurement of extracted power from an electromagnetic signal generated by a reference power transmitter with the power receiver and the reference power transmitter arranged in a reference configuration with the load being disconnected and the level of the induced signal being at the reference signal level.

This may provide advantageous performance in many embodiments.

In accordance with an optional feature of the invention, the predetermined loading indication includes power extracted by eddy currents induced in conductive elements of the power receiver.

The predetermined loading indication may represent a contribution to the power extracted from the electromagnetic signal from both the power extracted by the power receiver coil and for power extracted by other conductive elements of the power receiver, such as metal plates, casings, or other elements. Thus, it may include contributions from the presence of friendly metals.

This may allow a more accurate foreign object detection.

According to an aspect of the invention there is provided a power receiver for receiving a power transfer from a power transmitter via an electromagnetic signal, comprising: a power receiver coil for extracting power from the electromagnetic signal; a load controller arranged to disconnect a load of the power receiver coil during a foreign object detection interval; a power controller for transmitting power control messages to the power transmitter during the foreign object detection interval, the power control messages reflecting a difference between a level of an induced signal in the power receiver coil and a reference level; a message transmitter for transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level.

According to an aspect of the invention there is provided foreign object detection method for wireless power transfer system comprising a power transmitter and a power receiver for receiving a power transfer from the power transmitter via an electromagnetic signal; the method comprising: the power receiver performing the steps of: disconnecting a load of a power receiver coil during a foreign object detection interval; transmitting power control messages to the power transmitter during the foreign object detection interval, the power control messages reflecting a difference between a level of an induced signal in the power receiver coil and a reference level; transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level; and the power transmitter performing the steps of: receiving the power control messages and the predetermined loading indication from the power receiver; controlling a power level of the electromagnetic signal in response to the power control messages; performing, during the foreign object detection interval a foreign object detection in response to a comparison of a power level of the electromagnetic signal and the predetermined loading indication.

In accordance with an optional feature of the invention, the method is arranged to repeat the steps for a plurality of different values of the reference level.

This may provide improved foreign object detection in many embodiments.

According to an aspect of the invention there is provided a method of operation for a power receiver receiving a power transfer from a power transmitter via an electromagnetic signal; the method comprising: disconnecting a load of a power receiver coil during a foreign object detection interval; transmitting power control messages to the power transmitter during the foreign object detection interval, the power control messages reflecting a difference between a level of an induced signal in the power receiver coil and a reference level; and transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
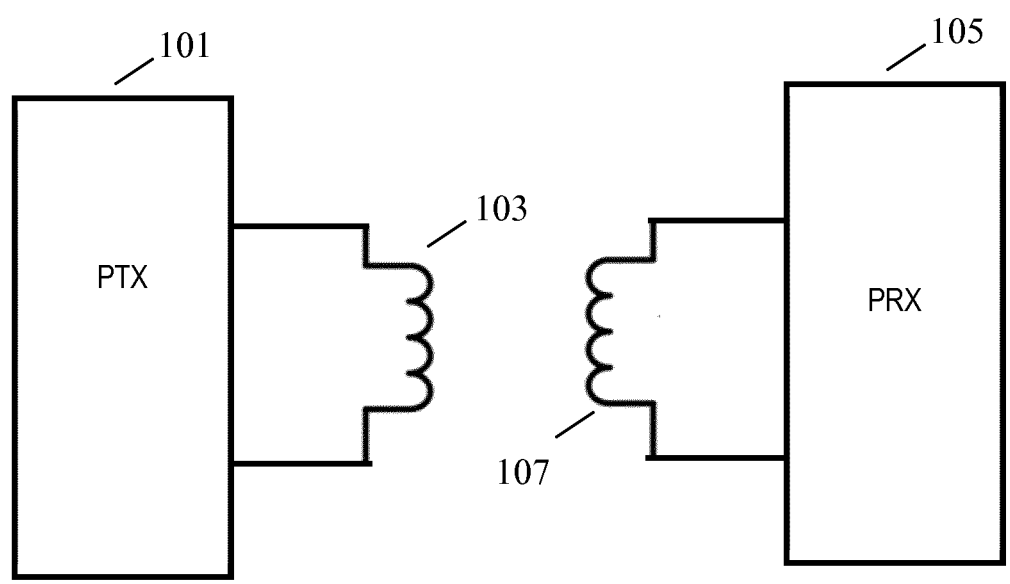
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiving device 105 which includes (or is coupled to) a receiver coil/inductor 107.

The system provides an electromagnetic signal, which in the power transfer phase may be referred to as the power transfer signal and in the foreign object detection interval may be referred to as the electromagnetic detection signal, from the power transmitter 101 to the power receiving device 105. Specifically, the power transmitter 101 generates an electromagnetic signal, which is propagated as a magnetic flux by the transmitter coil or inductor 103. The electromagnetic detection signal and/or the power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiving device 105 is specifically a power receiver which receives power via a receiver coil 107. However, in other embodiments, the power receiving device 105 may comprise a metallic element, such as a metallic heating element, in which case the power transfer signal induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, and in excess of 100 W and up to more than 1000 W for high power applications, such as e.g. kitchen applications. In the following, the operation of the power transmitter 101 and the power receiving device 105 will be described with specific reference to an embodiment in accordance with the Qi Specification (except for the herein described (or consequential) modifications and enhancements) or suitable for the higher power kitchen specification being developed by the Wireless Power Consortium. In particular, the power transmitter 101 and the power receiving device 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiving device 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit. However, these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is typically based on comparisons of measured transmit power and receiver power whereas detection that take place before the power transfer phase is typically based on measurements of a reflected impedance, e.g. by measuring the quality factor of the transmitter coil by using a small measurement signal.

As an example of the challenges to foreign object detection is the requirement to perform sufficiently accurate measurements in order to achieve a sufficiently reliable foreign object detection. For example, if a measurement for a foreign object detection takes place in the selection phase of a Qi power transfer initialization phase, the signal that the power transmitter provides for this measurement has to be small enough not to wake up the power receiver. However, this typically result in poor signal/noise ratios leading to reduced detection accuracy.

A power receiver exposed to a small measurement electromagnetic signal may show a leakage current that depends on the level of the measurement electromagnetic signal, the coupling between the primary and secondary coil, and the charging state of the capacitor at the output of the rectifier. This leakage current can therefore be different depending on the actual conditions currently experienced. Since leakage current influences the reflected impedance at the primary coil, the measurement of the quality factor also depends on the actual conditions and this typically prevents optimal detection.

The system of FIG. 1 uses a different approach for foreign object detection. The approach may in many embodiments provide improved foreign object detection and specifically may in many embodiments provide a more accurate foreign object detection when the system is not operating in the power transfer phase. The approach may further allow for low complexity and low resource requirements. An advantage of the approach is that it may be suitable for inclusion in many existing systems, such as specifically in a Qi wireless power transfer system, and indeed that this may often be achieved with few modifications. Thus, the approach provides a high degree of backwards compatibility.

Figure 2:
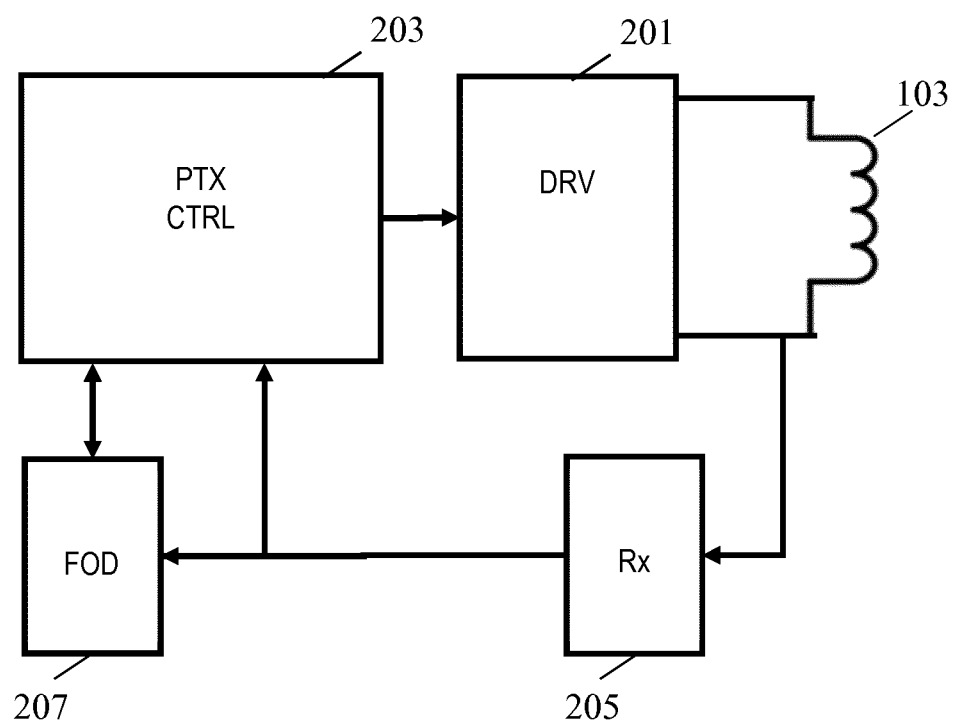
FIG. 2 illustrates an example of elements of a power transmitter in accordance with some embodiments of the invention.
Figure 3:
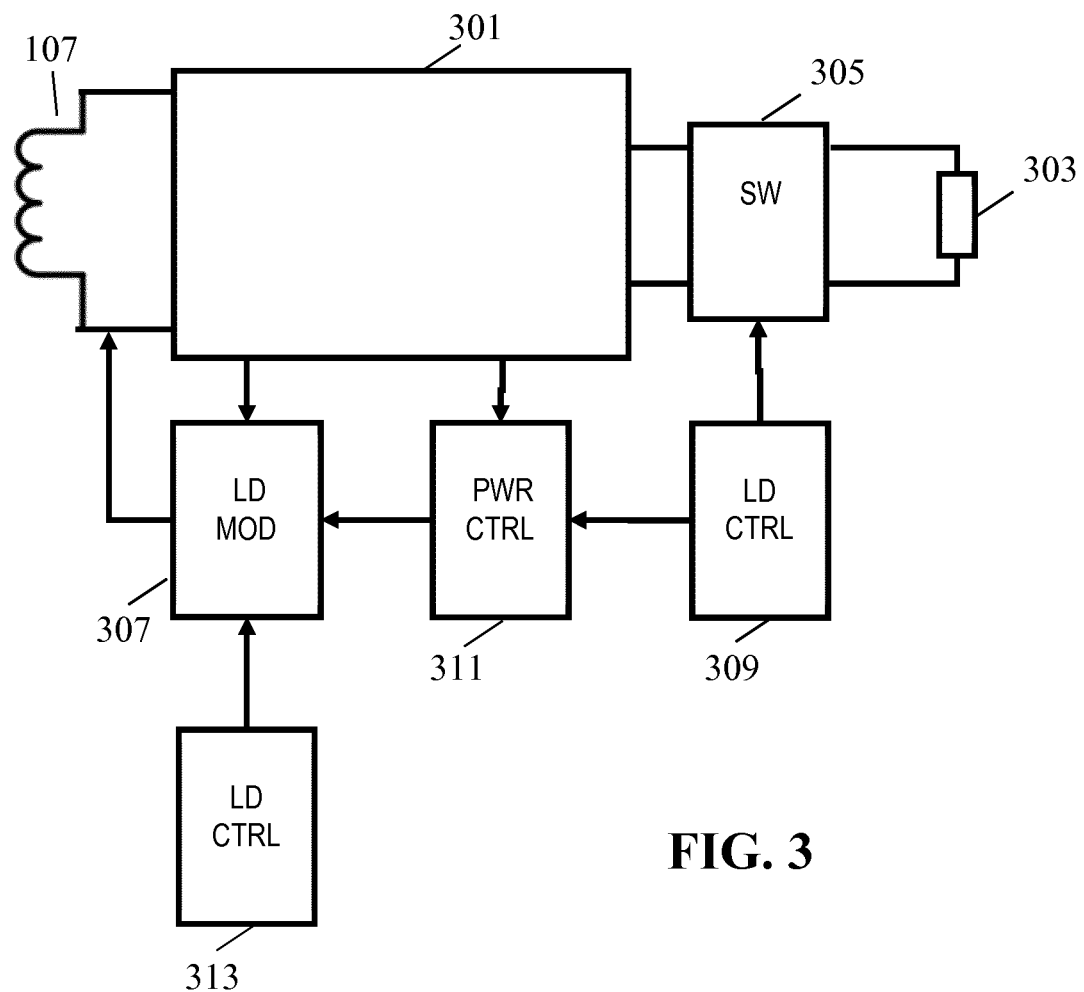
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates an electromagnetic signal which for brevity and clarity will also be referred to as the detection signal or the electromagnetic detection signal when the system is in a foreign object detection interval in which the described foreign object detection is performed. The electromagnetic signal is in the embodiment generated for the specific purpose of detecting whether any foreign objects are present or not. However, it will be appreciated that the electromagnetic signal may also have other purposes and in particular that it may in some embodiments provide power to the power receiver.

It will also be appreciated that functions used to generate the power transfer signal during a power transfer phase may also be used to generate the electromagnetic detection signal during the power transfer phase. For example, the same driver and output circuit is typically used to generate any drive signal for the transmitter coil 103 whether for the purpose of power transfer or foreign object detection (or both).

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and can control the power level of the drive signal, and accordingly the level of the generated electromagnetic signal (and specifically the detection signal prior to a power transfer phase). In particular, the power transmitter controller 203 is also a power loop controller controlling a power level of the electromagnetic signal in response to the power control messages received from the power receiver 105.

In order to receive data and messages from the power receiver 105, the power transmitter 101 comprises a message receiver 205 which is arranged to receive data and messages from the power receiver 105 (as will be appreciated by the skilled person, a data message may provide one or more bits of information). In the example, the power receiver 105 is arranged to load modulate the electromagnetic signal, i.e. the detection signal/power transfer signal generated by the transmitter coil 103, and the message receiver 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

The power transmitter 101 further comprises a foreign object detector 207 which is arranged to perform foreign object detection, i.e. to specifically detect whether any undesired conductive elements are likely to be present within the generated electromagnetic field.

During an interval in which foreign object detection is performed, i.e. during a foreign object detection (time) interval, the foreign object detector 207 may evaluate conditions to determine whether a foreign object is considered present or not. During the foreign object detection interval, the power transmitter 101 generates an electromagnetic detection signal and the foreign object detection is based on comparing the power level of this signal to an indication of the received power level with the indication being received from the power receiver 105.

The power level of the electromagnetic detection signal reflects the power that is extracted from the electromagnetic detection signal by conductive elements (including the receiver coil 107) in the electromagnetic field. It thus indicates the power extracted by the combination of the power receiver 105 as well as any foreign objects that may be present. The difference between the power level of the electromagnetic signal and the power extracted by the power receiver 105 accordingly reflects the power extracted by any foreign objects present. The foreign object detection may for example be a low complexity detection wherein a detection of a foreign object is considered to have occurred if the difference between the power level of the electromagnetic signal (henceforth referred to as transmit power level) exceeds the reported power extracted by the power receiver 105 (henceforth referred to as receive power level).

In the approach, the foreign object detection is accordingly based on a power level comparison between a transmitted power level and a reported received power level. The reaction to a detection of a foreign object may be different in different embodiments. However, in many embodiments, the foreign object detection interval may be part of a potential power transfer initialization, and the power transmitter 101 may be arranged to terminate this initialization in response to a detection of a foreign object.

FIG. 3 illustrates some exemplary elements of the power receiver 105.

The receiver coil 107 is coupled to a power receiver circuit 301 which couples the receiver coil 107 to a load 303 via a switch 305 (i.e. it is a switchable load 305). The power receiver circuit 301 includes a power control path which converts the power extracted by the receiver coil 107 into a suitable supply for the load. In addition, the power receiver circuit 301 may include various power receiver controller functionality required to perform power transfer, and in particular functions required to perform power transfer in accordance with the Qi specifications.

In order to support communication from the power receiver 105 to the power transmitter 101 the power receiver 105 comprises a load modulator 307. The load modulator 307 is arranged to vary the loading of the receiver coil 107 in response to data to be transmitted to the power transmitter 101. The load variations are then detected and demodulated by the power transmitter 101 as will be known to the person skilled in the art.

Figure 4:
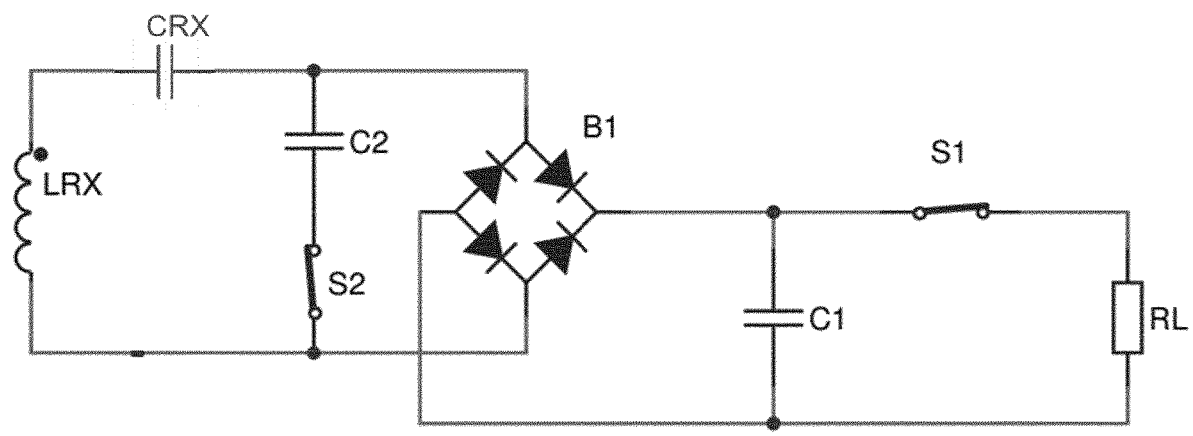
FIG. 4 illustrates an example of elements of a power receiver in accordance with some embodiments of the invention.

FIG. 4 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 303 which is indicated by reference sign RL via the switch 305 which is illustrated by switch S1. The switch 305 can accordingly be used to connect or disconnect the load from the power path and thus the load is a switchable load 305. It will be appreciated that whereas the switch S1 is shown as a conventional switch, it may of course be implemented by any suitable means including typically by a MOSFET. It will also be appreciated that the load 303 is illustrated as a simple passive port but that it may of course be any suitable load. For example, the load 303 may be a battery to be charged, a mobile phone, or another communication or computational device, may be a simple passive load etc. Indeed, the load 303 need not be an external or dedicated internal load but may for example include elements of the power receiver 105 itself. Thus, the load 303 illustrated in FIGS. 3 and 4 may be considered to represent any load of the receiver coil 107/the electromagnetic signal that can be disconnected by the switch 305/S1, and it is accordingly also referred to as a switchable load 305.

FIG. 4 further illustrates a load modulation capacitor C2 which can be connected or disconnected in parallel to the resonance circuit based on the switching of switch S2. The load modulator 307 may be arranged to control the switch S2 such that the load of the modulation capacitor C2 can be connected and disconnected in response to data to be transmitted to the power transmitter 101 thereby providing load modulation.

The power receiver 105 is arranged to enter a foreign object detection mode during a foreign object detection interval which specifically may be part of an initialization of a power transfer phase. The power receiver 105 comprises a load controller 309 which controls the switch 305 (equivalently the switch 305 can be considered part of the load controller). The load controller 309 can initiate the foreign object detection interval by disconnecting the load 303 from the power receiver, i.e. it disconnects a load of the power receiver circuit 301, and thus a load of the receiver coil 107 (the load controller 309 is arranged to reduce a loading of the receiver coil 107 during the foreign object detection interval).

It will be appreciated that the loading of the receiver coil 107 may not be completely switched off during the foreign object detection interval. For example, the power receiver 105 may still extract power for e.g. operating some internal circuitry. Thus, the load controller 309 may be arranged to disconnect a load from loading the receiver coil 107 while still allowing the receiver coil 107 to be loaded by one or more other loads. Indeed, the loading of the receiver coil 107 can be considered as being comprised of a load which is disconnected by the load controller 309 during the foreign object detection interval and a load which is not disconnected by the load controller 309. thus, the load 303 can be considered to represent the load that is disconnected by the receiver coil 107 during the foreign object detection interval. This load may include both an external or internal load for which the power transfer is established but may also include for example internal control functionality temporarily switched off during the foreign object detection interval.

The power receiver 105 includes a power controller 311 which is arranged to establish a power control loop with the power transmitter 101. Specifically, the power controller 311 can transmit power control messages to the power transmitter 101 and in response the power transmitter 101 may change the power level of the drive signal and thus the generated electromagnetic signal. Typically, the power controller 311 may generate power control error messages which indicate a request for the power transmitter 101 to increase or decrease the power level. The power controller 311 may determine the appropriate error messages by comparing a measured value to a reference value.

During power transfer, the power controller 311 may compare the provided power level with the required power level and request an increase or decreased power level based on this comparison.

During the foreign object detection interval, the power controller 311 is arranged to determine a difference between a level of a signal induced in the power receiver coil and a reference level. The level may typically be determined as a voltage level (specifically a level of an induced voltage) but could in other embodiments e.g., be a power level (specifically a level of an induced signal power) or a current level (specifically a level of an induced current). It will be appreciated that any suitable indication of a level of an induced signal may be used.

In many embodiments, the power controller 311 is arranged to compare a voltage level indication of an induced signal to a reference voltage, and to generate the power control messages based on this comparison. If the voltage is below the reference value, a power control message requesting the level of the electromagnetic signal to be increased is transmitted, and if it is above the reference value, a power control message requesting the level of the electromagnetic signal to be decreased is transmitted. In response, the power transmitter controller 203 increases or decreases the drive signal level to provide a corresponding change in the electromagnetic detection signal.

In this way, the power receiver 105 can control the level of the electromagnetic detection signal such that the level of the induced signal is driven towards the reference value. Specifically, the voltage over the transmitter coil 103 may be driven to be equal to a given reference voltage.

The approach thus allows for the power receiver 105 to be in control of establishing a predetermined configuration in which a typically predetermined load is provided and the induced signal, and specifically the induced voltage, is at a predetermined level. Thus, a reference operation condition is set up for the power receiver 105 (by the power receiver 105 itself).

The power receiver 105 further comprises a message transmitter 313 which is arranged to transmit a predetermined loading indication to the power transmitter 101. The message transmitter 313 is coupled to the load modulator 307 allowing the predetermined loading indication to be transmitted to the power transmitter 101 using load modulation (it will be appreciated that the power controller and the message transmitter may be considered to include the load modulation functionality separately represented by the load modulator 307 in FIG. 3).

The predetermined loading indication provides an indication of a loading of the power transmitter 101 by the power receiver 105 when in a scenario where the power receiver 105 is operating at the given operating point for the foreign object detection, i.e. when the switchable load 303 is disconnected and the induced signal level is at/equal to the reference level. Specifically, the predetermined loading indication is indicative of the power that would be extracted from the electromagnetic detection signal when the system is operating in a scenario and operating configuration with the switchable load 303 being disconnected and the induced signal in the power receiver coil being at the reference level. Thus, the predetermined loading indication indicates the loading of the electromagnetic detection signal when the switchable load 305 is disconnected and the level of the induced signal is equal to the reference level.

The predetermined loading indication accordingly provides information of the effect that the power receiver 105 has on the electromagnetic detection signal during the foreign object detection interval. During this interval, the power receiver 105 transmits power control messages such that the level of the induced signal is driven towards a given reference value and with the switchable load 303 being disconnected.

The predetermined loading indication is furthermore a predetermined indication. It is based on assumptions that the induced signal level is at the reference level and that the switchable load 303 is disconnected. In many embodiments, the predetermined loading indication may indeed be a stored value which is transmitted to the power transmitter 101 simply by being retrieved from memory and transmitted without being modified by any measurement or modification based on current conditions. Indeed, in many embodiments, the only measurement made is that of the induced signal level such that this can be driven towards the reference level. However, in many embodiments, the predetermined loading indication is also independent of this, i.e. the predetermined loading indication is retrieved and transmitted to the power transmitter 101, and the measurements of the induced signal are then used to drive the level to the reference level such that the actual operating condition is equal to that assumed for the predetermined loading indication.

For example, during the design or manufacturing phase for a power receiver, it may be positioned in a test set-up wherein an electromagnetic signal is provided and wherein it is assured that no other objects are present to extract power from the electromagnetic detection signal. The power receiver may be set to a configuration corresponding to the switchable load 303 being disconnected (for example no load may be included or a switch of the power receiver may disconnect the load). The power receiver may then be operated in the foreign object detection mode resulting in power control messages being generated to drive the level of the induced signal to the reference level. The test setup may control the power of the electromagnetic detection signal accordingly. When a sufficiently stable operation is achieved, the power of the electromagnetic signal is measured (e.g. by measuring the power of a drive signal driving a coil generating the electromagnetic signal). The measurement can be under closely controlled conditions, and with highly accurate measurement devices and thus the extracted power can be very accurately measured. The measured value may then be programmed into the manufactured power receivers and used as the predetermined loading indication.

The predetermined loading indication is thus a predetermined value which is transmitted to the power transmitter and which provides an indication of the loading that the power receiver is expected to exercise on the electromagnetic detection signal when the power receiver 105 is operating in the foreign object detection operating configuration. The value is not merely a measurement of the actual power of the signal induced in the receiver coil 107 but is a predetermined value that may include e.g. loading caused by conductive elements of the power receiver 105 itself (often referred to as friendly metal). Thus, the message transmitter 313 transmits a predetermined loading indication which indicates the expected loading of the electromagnetic detection signal by the presence of the power receiver 105 operating in the foreign object detection configuration.

The message receiver 205 of the power transmitter 101 receives the predetermined loading indication and forwards this to the foreign object detector 207. The foreign object detector 207 then proceeds to compare the power level of the generated electromagnetic detection signal, i.e. the transmit power level, to the predetermined loading indication. In many embodiments, the foreign object detector 207 may simply subtract the predetermined loading indication from the transmitter power level. If the result exceeds a given threshold, the foreign object detector 207 may determine that a foreign object has been detected, and otherwise it is considered that no foreign object has been detected.

Specifically, the power transmitter may determine its transmitted power level during the foreign object detection interval for which a received power is reported from the power receiver 105 by the predetermined loading indication. Based on these values, the foreign object detector 207 can calculate the difference between the transmitted and received power and check if the difference is within a small tolerance range. If the difference is outside the range, the foreign object detector 207 indicates that a foreign object has been detected. If it is within the range, the foreign object detector 207 indicates that no detection of a foreign object has occurred. This range may be chosen such that the power dissipation in a metal object not detected by this power difference is considered acceptably low. Of course, it will be appreciated that other, and typically more complex, decision criteria may be used on other embodiments.

The approach thus establishes a foreign object detection mode or configuration during a foreign object detection interval. In this mode, the power receiver 105 is operating with well defined operating parameters (reduced predictable load and with reference level induction) and instead of measuring the received power level, a predetermined value is used to represent the loading of the electromagnetic detection signal by the power receiver 105.

In the approach, the power receiver 105 accordingly transmits a predetermined loading indication to the power transmitter 101. The predetermined loading indication includes an indication of the power loading of the electromagnetic detection signal when the power receiver 105 is operating in a specific test mode with the switchable load 305 disconnected and the level of the signal induced in the receive coil 107 at a specific reference level. The predetermined loading indication may specifically represent a previous determination of this loading, typically during a manufacturing or design phase, and thus represents the expected or assumed performance of the power receiver 105 when operating in such a scenario.

In addition to transmitting the predetermined loading indication, the power receiver 105 is also arranged to enter into this test mode, i.e. it is arranged to control the operation of the system to reach an operating scenario as close as possible to the nominal scenario that the predetermined loading indication represents. It does this by transmitting power control messages to the power transmitter 101 where the power control messages are generated based on comparing an indication of the induced signal level to a reference level. In many embodiments, a voltage following rectification and smoothing is used. The power control messages result in the level of the electromagnetic detection signal changing and thus in the induced signal being driven to a level corresponding to the reference level, and thus corresponding to the nominal configuration for which the predetermined loading indication is representative. Thus, the power receiver 105 performs two operations, namely it provides information of the expected power extracted for a specific nominal scenario, and then it enters a foreign object detection mode in which it configures the system to operate in this specific scenario.

It will be appreciated that the predetermined loading indication may be transmitted at any time. Specifically, in some embodiments, it may be transmitted the first time the power receiver 105 and the power transmitter 101 communicates with each other. In such scenarios, the power transmitter 101 may e.g. store the received predetermined loading indication and use this for all future foreign object detections in accordance with the described approach. In other embodiments, the predetermined loading indication may be transmitted each time the power receiver 105 enters a foreign object detection test mode, i.e. in each foreign object detection interval. Indeed, the transmission of the predetermined loading indication may be used to indicate that the power receiver 105 is entering this mode and thus may indicate to the power transmitter 101 that a foreign object detection test should be initiated.

Thus, it will be appreciated that the transmission of the predetermined loading indication may be separate from the power receiver 105 actually entering the foreign object detection test mode, i.e. it may be separate from the actual driving of the induced signal to the reference level.

The foreign object detection performed by the foreign object detector 207 may be performed at different times in different embodiments, and indeed different approaches for determining the time to perform the foreign object detection may be used in different embodiments.

In many embodiments, there will be a delay from the beginning of a foreign object detection interval until the induced signal is driven sufficiently close to the reference level. Indeed, the power control loop used to drive the induced signal to this level is typically relatively slow. Therefore, the foreign object detection by the foreign object detector 207 is typically delayed with respect to the start of the foreign object detection interval, and indeed with respect to the power receiver 105 entering the foreign object detection test mode.

In some embodiments, the foreign object detector 207 may simply have a fixed predetermined delay and it may be assumed that after this delay the power control loop has had sufficient time to bring the induced signal level sufficiently close to the reference level. In other embodiments, the foreign object detector 207 may e.g. determine a suitable time for the foreign object detection in response to the received power control messages. Specifically, it may determine that a foreign object detection is not performed until the power control messages include a given amount of power request transitions from requesting more power to requesting less power and vice versa. For example, if the power receiver 105 upon entering the foreign object detection interval measures an induced power level which is far too low, it will proceed to request increased power levels until the induced level (slightly) exceeds the reference level, at which state it will transmit a power down request. This may be detected by the power transmitter 101 which may take it as an indication that the induced level is sufficiently close to the reference level for the predetermined loading indication to be likely to be a sufficiently accurate indication of the power being extracted. Indeed, when stable conditions occur, the power control messages will typically have an equal amount of power up and power down requests, and this situation may be detected and used to initiate the foreign object detection by the foreign object detector 207.

In some embodiments, the power receiver 105 may transmit an indication to the power transmitter 101 that the power receiver 105 has reached a sufficiently stable level with the induced level corresponding to the reference level. This may be determined based on measurements of the induced level at the power receiver 105. In such embodiments, the power transmitter 101 may not perform foreign object detection until the message from the power receiver 105 is received indicating that the test mode conditions have been reached.

Indeed, in some embodiments, the message may also transmit the predetermined loading indication, i.e. the power receiver 105 may not transmit the predetermined loading indication until the conditions are sufficiently stable for the foreign object detection to be performed. Thus, the power receiver 105 may be arranged to transmit the predetermined loading indication in response to a determination that the level of the induced signal meets a similarity requirement with respect to the reference level. The similarity requirement may simply be that the difference between them is below a threshold. The power transmitter 101 may be arranged to initiate foreign object detection in response to receiving the message, and specifically in response to receiving the predetermined loading indication.

It should be noted that the predetermined loading indication is predetermined and provides the estimated power being extracted when the induced signal is at the reference level. However, due to variations, drift, etc., the actual level of the induced signal, even when the power control is in a stable adapted state, will in practice vary slightly from this. Thus, the predetermined loading indication provides the nominal power extraction from the nominal test configuration, rather than provide the loading for the operating conditions. However, the power control loop will ensure that this potential deviation is sufficiently low to not unacceptably affect the foreign object detection.

In many embodiments, the level of the induced signal which by the power receiver 105 is controlled to be at a reference level is a voltage level indicative of a voltage over the receiver coil. In some embodiments, the power receiver 105 may directly measure e.g. a peak, peak-to-peak, average absolute, or RMS voltage during the foreign object detection interval and generate power control messages which drive this value to a typically predetermined reference value.

A particularly advantageous approach in many embodiments, is to control the level of the electromagnetic detection signal such that a voltage following rectification and smoothing (low pass filtering) is driven towards a reference voltage. In many embodiments, the power controller may be arranged to generate the power control messages to reflect a difference between a reference voltage and a voltage measured after rectification and low pass filtering of the induced signal.

For example, for the power path of FIG. 3, rectification is provided by the bridge B1 and a low-pass filtering smoothing effect is achieved by capacitor C1. In this example, the level considered may be the voltage over the capacitor C1. Thus, the power controller 311 may during the foreign object detection interval measure the voltage over C1 and compare it to a predetermined reference voltage. If the voltage over C1, also referred to as the rectified voltage, is lower than the predetermined reference voltage a power up request is transmitted to the power transmitter 101 and if the rectified voltage is higher than the predetermined reference voltage a power down request is transmitted. The electromagnetic detection signal will thus be driven to a given level which results in the rectified voltage being at a reference level.

It will be appreciated that if the loading of the rectified voltage (i.e. the current drawn from the rectified voltage (e.g. by internal circuitry)) is sufficiently low relative to the size of the smoothing capacitor C1, the ripple will be insignificant and the arrangement of the bridge B1 and smoothing capacitor C1 effectively acts as a peak detector circuit. It will also be appreciated that for higher ripples, the system may compensate for the ripple when measuring the voltage, e.g. it may synchronize measurements to the ripple or may e.g. make multiple measurements and average these.

The use of a voltage level, and specifically a rectified and smoothed voltage level, not only facilitates implementation but provides a parameter that is relatively easy to measure and which can directly provide improved performance. Specifically, the electromagnetic field strength depends on the induced voltage rather than the induced or extracted power. Thus, by controlling the voltage level to be at a given reference level, it can be ensured that the electromagnetic field strength is relatively high even though very little power is extracted by the power receiver 105. However, this relatively high electromagnetic field strength will result in a higher amount of power being induced in foreign objects. Thus, the approach may ensure that during the foreign object detection interval the power being extracted by a foreign object is relatively high whereas the power being extracted by the power receiver 105 is relatively low. This may result in a more reliable and accurate detection.

The described approach may thus utilize a test mode/configuration in which the power transmitter provides a measurement signal in the form of an electromagnetic detection signal with a good signal to noise ratio at light load conditions at the power receiver. In this test mode, the power receiver may be powered-up and in communication with the power transmitter, and this operation may be based on the power receiver extracting power from the electromagnetic detection signal. The power receiver may control the rectified voltage to reach a predefined high level at a fixed light load condition by disconnecting at least some element of a load which is powered during the power transfer phase. The driving of the rectified voltage to the reference value is achieved by transmitting power control messages to the power transmitter which adapts the level of the electromagnetic detection signal accordingly.

Due to these fixed conditions when operating in this test mode in the foreign object detection interval, the power extracted by the power receiver can be estimated more accurately and indeed can be predetermined. The approach enables the power receiver to report accurate data on the loading of the electromagnetic detection signal when performing foreign object detection. The improved accuracy of this information enables the power transmitter to detect a foreign object with a better resolution and higher accuracy.

The power receiver can report an accurate predetermined received power value for the reference conditions to the power transmitter. The received power value can e.g. be pre-programmed or installed into the power receiver during production. Indeed, since the induced level, and specifically the rectified voltage level, and the load are fixed, the power loss in the components, such as in the receiver coil and the rectifier, can be estimated in advance and the power receiver does not need to measure a current in order to calculate the received power. Rather, it allows a predetermined loading indication to be stored and simply retrieved and transmitted to the power transmitter. The value can e.g. be stored in memory of the power receiver, or may be stored as e.g. a resistor setting indicating this value relative to a reference value.

Further, although the loading of the electromagnetic detection signal may be light, the required magnetic field strength to generate the high rectified voltage will typically be relatively high. Therefore a foreign object exposed to this field will dissipate a relative high amount of power and thus a scenario is created where the loading of the electromagnetic detection signal by the power receiver is relatively low whereas the loading by a foreign object will typically be relatively high. This further facilitates and provides for a more accurate detection.

Indeed, when the load condition is light, i.e. when the power receiver extracts only a low amount of power, the presence or absence of a foreign object can have a relatively larger impact on power needed to generate the electromagnetic detection signal to result in the induced signal level matching the reference level than when the load is heavy. This allows for a more reliable foreign object detection.

For example, for a given magnetic field generated by the power transmitter driving an appropriate current through the transmitter coil, the power dissipation in a foreign object exposed to this field may be, say, 0.3 W. If a power receiver is exposed to the same field (e.g. when the foreign object is located between the power transmitter and power receiver), the received power depends on the actual loading by the power receiver, and this depends on the load of the power receiver. With a disconnected switchable load, the power receiver may only extract, say, 1 W and with a connected switchable load, it may extract, say, 5 W. The corresponding transmitted power would then be respectively 1.3 W and 5.3 W. Compared to the received power, the power difference is respectively 30% and 6%, thus providing for a much more reliable detection in the first scenario.

The specific values for various parameters of the approach will depend on the preferences and requirements of the individual system.

However, in many embodiments particularly advantageous operation may found for a reference voltage level which is not below 3V and/or not above 30V, and in some embodiments, not below 5V and not above 20V. This may specifically be the case for the voltage level being a level of the rectified voltage (or possibly e.g. a peak, RMS or average absolute coil voltage). Setting the reference voltage within these ranges will typically ensure that the magnetic field strength of the electromagnetic detection signal is sufficiently high to induce a relatively easily detectable level of power in a foreign object yet will allow the voltages to be at a level where they can easily be used in the power receiver. For example, it may ensure that the levels are sufficiently low to not risk damaging electronic components, not risk electric shocks etc.

In many embodiments, the loading of the receiver coil when the load is disconnected is not above 1 W and/or not less than 100 Ohm. In some embodiments, the loading of the receiver coil is not above 500 mW or even 100 mW and/or not less than 1 kOhm or even 10 kOhm.

Maintaining the loading low/light, and thus the power extracted by the receiver coil 107 low and the resistive component on the load of the receiver coil 107 high, ensures that the impact of any foreign objects being present will have a higher relative effect on the power level of the electromagnetic detection signal and accordingly will facilitate the foreign object detection.

In many embodiments, the reference level is a predetermined reference level. For example, the reference voltage for the rectified voltage may be stored in the power receiver 105 during manufacturing and the power receiver 105 may when operating in the foreign object detection mode retrieve this value and generate power control messages to drive the measure voltage over the smoothing capacitor to this value. This approach may ensure that the power receiver 105 always operates at the same operating point when a foreign object detection is performed in accordance with this approach.

Using a predetermined reference level may facilitate the generation of the predetermined loading indication. The predetermined loading indication may be generated to reflect a measurement of extracted power from an electromagnetic signal generated by a reference power transmitter with the power receiver and the reference power transmitter arranged in a reference configuration. This may as previously described be done during a manufacturing or design process. A power receiver may be positioned on a reference transmitter in a given configuration, for example corresponding to the power receiver being positioned at a nominal or optimal position for power transfer (e.g. with the transmitter coil and the receiver coil as close to each other as possible) and with no other object present that could potentially extract power from the electromagnetic signal. The power receiver and the reference power transmitter may then enter into the foreign object detection mode with the power receiver driving the electromagnetic field strength to result in a given reference level, e.g. a given voltage over the smoothing capacitor. The power used to drive the transmitter coil may then be calculated based on measurements of e.g. the current and voltage of the transmitter coil.

The resulting measured power level of the drive signal for the transmitter coil, and thus the power level of the electromagnetic signal, may be stored in the power receiver as the predetermined loading indication. In addition, the reference level may be stored. In some systems, this process may be performed for each power receiver being manufactured as part of the manufacturing phase. In many applications, the power receivers will be sufficiently similar for the process only to be performed once for each type of power receiver and the same values can be stored in all power receivers of that type. Whenever, a power receiver is subsequently entering the foreign object detection mode, it can simply extract the reference level and use this for the power control, and can extract the stored predetermined loading indication and transmit this to the power transmitter. Thus, a low complexity improved foreign object detection can be achieved.

In some embodiments, the predetermined loading indication may be determined as a predetermined function of the reference level.

For example, the power receiver may be designed to enter the foreign object detection mode in which the rectified voltage is driven to a value within a given range, say from 5V to 15V, but with no specific voltage being described. The power receiver may then drive the voltage to a given but not predetermined level within this range. For example, the value may depend on other factors, such as a desired voltage for an external load (e.g. if the external load requires a voltage of 5V the reference level is set to 5V, if it requires a voltage of 12V the reference level is set to 12V etc).

In such cases, rather than a single value for the predetermined loading indication being stored, a function may be stored which provides a predetermined loading indication as a function of the reference voltage. Thus, the power receiver can retrieve the function and evaluate this for the selected reference level and transmit the resulting value to the power transmitter.

The predetermined function may for example be stored as a mathematical expression which e.g. may be determined by curve fitting to a plurality of measurement results obtained by tests during manufacturing or design as described above. As another example, the predetermined function may be provided as a set of related values in a look-up-table. For values not directly included in the look-up-table, the power receiver may e.g. determine the predetermined loading indication by interpolation.

In many embodiments, the system may be arranged to perform the described process for a range of different values of the reference level. For example, foreign object detection may be performed for a reference voltage of 5V, 10V, 15V, and 20V. In many scenarios, such an approach may provide improved detection accuracy. Also, a plurality of measurements with slightly different operating conditions may allow more complex detection algorithms. For example, a foreign object detection may be considered to have occurred if three out of the four tests indicate that a foreign object is present.

An advantage of the described approach is that it is particularly suitable for inclusion in many current wireless power transfer systems. In particular, the approach is highly compatible with current approaches of the Qi wireless power transfer specifications.

Indeed, the approach fits very well into particularly the calibration phase of the Qi power transfer initialization approach.

Qi power initialization starts with a selection phase in which the presence of an object may be detected. The power transmitter then moves to the ping phase wherein the power transmitter generates a ping electromagnetic signal and detects whether the detected object responds as expected for a power receiver. If so, the system moves onto the identification and configuration phase and otherwise the power transmitter returns to the Selection phase. In the identification and configuration phase messages are exchanged between the power receiver and the power transmitter identifying parameters, such as version number, maximum requested power, and other configuration data suitable for setting up the power transfer.

For older and typically lower power versions, the system then moves onto the power transfer phase. However, if both the power transmitter and power receiver support newer versions of the Qi standard, the system may move into the negotiation phase where messages are exchanged between power receiver and power transmitter to negotiate different operating parameters, such as the acceptable power level interval. Following the negotiation phase, the system moves into a calibration phase after which it moves into the power transfer phase. If any errors occur in the different phases, the power transmitter returns to the Selection phase.

In the calibration phase, the power transmitter and power receiver are calibrated to each other and specifically the calibration of the transmitted power and received power relationships is determined. The calibration phase includes two phases, namely a first Calibration phase which is performed with a light load at the power receiver. This is followed by a second calibration phase wherein the power receiver connects the load such that a loading of the power transmitter is closer to that expected during the power transfer phase.

Further details of the Qi wireless power transfer system, and in particular the Calibration phase, can be found in "The Qi Wireless Power Transfer System, Power Class 0 Specification, parts 1 and 2: Interface Definitions", Version 1.2.2 of April 2016.

In particular, section 5.1.2.5 describes the calibration phase from a power transmitter point of view with FIG. 23 illustrating two states in the calibration phase, namely the light load state and the connected load state. The power transmitter stays within one of these states until it is satisfied with the reported received power. It will only complete the calibration phase if the received power is satisfactory for both states. The section provides examples of reasons for not being satisfied. Section 5.1.3.5 describes the calibration phase from a power receiver point of view.

The described approach for foreign object detection fits extremely well into the calibration phase, namely at the light load state, where the power transmitter makes use of the reported received power in order to compare this with its transmitted power to assess if the difference is within an acceptable range. The approach may allow the power receiver to provide a more accurate indication of the received power by using a predetermined value for a given reference induced level. This has been found to often provide substantially more accurate indications than measurements of the received power level as defined in section 11.4.2 of the Qi specification. This allows the power transmitter to use a small range for the power difference detection and enables an accurate estimation of the presence/absence of a foreign object.

Moreover, as a light load condition is already included in the calibration phase, the described approach for accurate detection of a foreign object can be introduced to the calibration phase with minimal changes to the Qi specification. Also, many receivers may include circuitry for e.g. controlling the rectified power level using power control messages during the power transfer phase, and thus this can often easily be modified to provide the required functionality during the calibration phase.

Indeed, it will be appreciated that the described approach may provide many different advantages and may generally improve foreign object detection in wireless power transfer systems such as in particular Qi wireless power transfer systems. These advantages may include:

More accurate received power estimation by the power receiver. Effects that may contribute to this include:
  The relative difference caused by a power loss in metal is larger at light load then at connected load
  The measured rectified voltage has lower ripple at light load and is therefore more accurate than at connected load
  Fewer or even no parameters to measure as the received power is dependent on a single parameter (the induced signal level, e.g. rectified voltage) which may typically be a predetermined value
    Uncertainty in many parameters (current, internal power loss) will not affect the foreign object detection.
  The relation between the received power and the single (possibly predetermined) parameter can be predetermined with help of accurate measurement equipment.
  Less dependency on other (often less) accurate methods, such as the quality factor measurements based foreign object detection method.
Measurement of single (predetermined) parameter and pre-determined relation between this parameter and the received power allows for less complex, more reliable and cheaper implementation of the power receiver
The power receiver is powered and operational in the foreign object detection mode. This allows e.g.
  Shorter time between the accurate measurement of power transmitter (light load condition in calibration phase) and finalization of the calibration phase; with other methods, the power transmitter measures accurately at the selection phase, meaning that ping, identification & configuration and negotiation phases need to be performed before the power transmitter enters the calibration phase. A shorter time between the accurate measurement of power transmitter and finalization of the calibration phase reduces the probability that a foreign object enters the electromagnetic field during that time, which would make the calibration invalid.
  Re-entering the test mode from power transfer mode, e.g. on the suspicion of a potential unwanted heating of metal (foreign object or too much exposure of friendly metal), thereby letting the power receiver continue to function. This allows the power receiver e.g. to
    Inform the user that the charging is shortly suspended for an accurate check.
    Inform the user that the power will be reduced.
    Suggest the user to check for the presence of a foreign object
    Suggest the user to check for the alignment of the power receiver, because friendly metal might be exposed too much to the magnetic field.
    Keep track of the number of events that the power transmitter reports on potential unwanted heating of metal; it would lose this track if the power for its volatile memory is interrupted by a re-start of the power transmitter from the selection phase.
Backwards compatibility with many installed power transmitters, and in particular with Qi power transmitters v1.2 and lower.
  A more accurate reporting of received power at light load in the first part of the calibration phase does not disturb the existing calibration procedure of v1.2. It actually improves the calibration procedure
  Controlling the power transmitter at light load in the first part of the calibration phase with control errors to regulate the induced signal value to a pre-defined value is not precluded in v1.2
  Disconnecting the load and controlling the power signal in power transfer phase is already allowed in v1.0, v1.1 and v1.2. This allows for entering a test-mode (light load conditions) in the power transfer phase.
  The power receiver can find out if the power transmitter supports the new feature by requesting for the identification packet (5.3.3.3), which contains the version of the power transmitter, in the negotiation phase. Another possibility is to add a specific request packet to the negotiation phase that the power receiver uses to check if the power transmitter supports the new feature.
  The power receiver only relies on the new feature after finding out that the power transmitter supports it, e.g. the power receiver then may:
    request the power transmitter to return to the light load part of the calibration phase when the system is in the power transfer phase, in order to re-check accurately and for re-calibration.
    request the power transmitter to do a critical check on potential heating of metal at light load condition in the power transfer phase.
Backwards compatibility with many installed power receivers, and in particular with Qi receivers v1.2 and lower:
  A power receiver supporting the new feature may communicate this to the power transmitter. It can do so by the version in the identification packet (5.2.3.8), or by using a specific request packet in the negotiation phase: request if power transmitter supports this feature—this implicitly indicates that the power receiver supports the feature. The power transmitter only relies on the accurate received power measurement reporting in light load condition after it has received an indication that this new feature is supported by the power receiver.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A wireless power transfer system comprising a power transmitter and a power receiver for receiving a power transfer from the power transmitter via an electromagnetic signal;

the power receiver comprising:
  a power receiver coil for extracting power from the electromagnetic signal;
  a load controller arranged to disconnect a load of the power receiver coil during a foreign object detection interval;
  a power controller for transmitting power control messages to the power transmitter during the foreign object detection interval, the power control messages reflecting a difference between a level of an induced signal in the power receiver coil and a reference level;
  a message transmitter for transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level; and the power transmitter comprising:
  a power transmitter coil for generating the electromagnetic signal;
  a message receiver for receiving the power control messages and the predetermined loading indication from the power receiver;
  a power loop controller for controlling a power level of the electromagnetic signal in response to the power control messages;
  a foreign object detector for, during the foreign object detection interval, performing a foreign object detection in response to a comparison of the power level of the electromagnetic signal and the predetermined loading indication.

2. The wireless power transfer system of claim 1 wherein the level of the induced signal is represented by a voltage level indicative of a voltage over the power receiver coil.

3. The wireless transfer system of claim 1 wherein the power controller is arranged to generate the power control messages to reflect a difference between a reference voltage and a voltage measured after rectification and low pass filtering of the induced signal.

4. The wireless transfer system of claim 2 wherein the reference level is a voltage level not below 3V and not above 30V.

5. The wireless transfer system of claim 1 wherein the reference level is a predetermined reference level.

6. The wireless transfer system of claim 1 wherein a loading of the power receiver coil when the load is disconnected is not above 1 W.

7. The wireless transfer system of claim 1 wherein a resistive component of a loading of the power receiver coil when the load is disconnected is not less than 100 Ohm.

8. The wireless transfer system of claim 1 wherein the power receiver is arranged to determine the predetermined loading indication as a predetermined function of the reference level.

9. The wireless transfer system of claim 1 wherein the foreign object detection is part of a calibration phase prior to initiation of a power transfer phase.

10. The wireless transfer system of claim 1 wherein the predetermined loading indication reflects a measurement of extracted power from an electromagnetic signal generated by a reference power transmitter with the power receiver and the reference power transmitter arranged in a reference configuration with the load being disconnected and the level of the induced signal being at the reference signal level.

11. The wireless transfer system of claim 1 wherein the predetermined loading indication includes power extracted by eddy currents induced in conductive elements of the power receiver.

12. A power receiver for receiving a power transfer from a power transmitter via an electromagnetic signal, comprising:
  a power receiver coil for extracting power from the electromagnetic signal;
  a load controller arranged to disconnect a load of the power receiver coil during a foreign object detection interval;
  a power controller for transmitting power control messages to the power transmitter during the foreign object detection interval, the power control messages reflecting a difference between a level of an induced signal in the power receiver coil and a reference level;

a message transmitter for transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level.

13. A foreign object detection method for wireless power transfer system comprising a power transmitter and a power receiver for receiving a power transfer from the power transmitter via an electromagnetic signal; the method comprising:

the power receiver performing the steps of:
   disconnecting a load of a power receiver coil during a foreign object detection interval;
   transmitting power control messages to the power transmitter during the foreign object detection interval, the power control messages reflecting a difference between a level of an induced signal in the power receiver coil and a reference level;
   transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level; and the power transmitter performing the steps of:
   receiving the power control messages and the predetermined loading indication from the power receiver;
   controlling a power level of the electromagnetic signal in response to the power control messages;
   performing, during the foreign object detection interval a foreign object detection in response to a comparison of a power level of the electromagnetic signal and the predetermined loading indication.

14. The method of claim 13 arranged to repeat the steps for a plurality of different values of the reference level.

15. A method of operation for a power receiver receiving a power transfer from a power transmitter via an electromagnetic signal; the method comprising:

disconnecting a load of a power receiver coil during a foreign object detection interval;

transmitting power control messages to the power transmitter during the foreign object detection interval, the power control messages reflecting a difference between a level of an induced signal in the power receiver coil and a reference level; and transmitting a predetermined loading indication for the reference level to the power transmitter, the predetermined loading indication being indicative of a predetermined amount of power being extracted from the electromagnetic signal by the power receiver when the load is disconnected and the induced signal in the power receiver coil is at the reference level.

* * * * *